United States Patent [19]

Emura et al.

[11] Patent Number: 5,007,601
[45] Date of Patent: Apr. 16, 1991

[54] WATER DEPTH MEASURING DEVICE FOR A FISHING REEL

[75] Inventors: Masaharu Emura; Takehiro Kobayashi, both of Hiroshima, Japan

[73] Assignee: Ryobi Ltd., Hiroshima, Japan

[21] Appl. No.: 478,020

[22] Filed: Feb. 9, 1990

Related U.S. Application Data

[63] Continuation of Ser. No. 399,407, Aug. 28, 1989, abandoned, which is a continuation of Ser. No. 155,849, Feb. 16, 1988, abandoned.

[30] Foreign Application Priority Data

Feb. 16, 1987 [JP] Japan .............................. 62-21617[U]

[51] Int. Cl.$^5$ ............................................ A01K 97/12
[52] U.S. Cl. ...................................................... 242/223
[58] Field of Search .............. 242/223; 33/129, 132 R, 33/134 R, 141

[56] References Cited

U.S. PATENT DOCUMENTS

| | | | |
|---|---|---|---|
| 2,874,477 | 2/1959 | McConnell | 33/129 |
| 3,585,076 | 6/1971 | Prange | 33/134 R X |
| 3,909,949 | 10/1975 | Miyamae | 33/129 |
| 4,585,182 | 4/1986 | Atobe | 242/84.1 M |
| 4,620,371 | 11/1986 | Murakami et al. | 242/84.1 M X |
| 4,697,758 | 10/1987 | Hirose et al. | 242/84.1 M |

FOREIGN PATENT DOCUMENTS

| | | | |
|---|---|---|---|
| 461632 | 6/1928 | Fed. Rep. of Germany | 33/129 |
| 60-151368 | 10/1985 | Japan | 242/84.1 M |

Primary Examiner—Joseph J. Hail, III
Attorney, Agent, or Firm—Finnegan, Henderson, Farabow, Garrett, and Dunner

[57] ABSTRACT

A water depth measuring device for a fishing reel has a mounting seat integrally provided on an upper portion of a reel body. A main section of the measuring device is integrally formed and includes a watertight compartment housing electrical components such as a sensor, a controller, an indicator, a sound maker, and a power supply. A rotation detection section of the measuring device is provided in a projecting case mounted on the reel body and includes a roller mechanism having a magnet attached thereto. A roller included in the roller mechanism is biased into contact with a fishline wound on the fishing reel to rotate upon cast of the fishline from the fishing reel to cause rotation of the magnet and the generation of a flux signal. The sensor in the main section of the measuring device detects the flux signal and an indication of the length of the fishline cast is displayed on the indicator. The sound maker provides an audible signal indicating the cast of a selected length of fishline. The main section and rotation transmitting section are separately mounted on the reel body.

8 Claims, 2 Drawing Sheets

000
WATER DEPTH MEASURING DEVICE FOR A FISHING REEL

This application is a continuation of application Ser. No. 07/399,407, filed Aug. 28, 1989 now abandoned which is a continuation of Ser. No. 07/155,849 filed Feb. 16, 1988 now abandoned.

FIELD OF THE INVENTION

The present invention relates to a water depth measuring device for a fishing reel in which the unwound length of a fishline is calculated by a controller so that the depth of water at which a fishhook or the like is suspended may be indicated.

BACKGROUND OF THE INVENTION

In boat fishing or the like, the success of a catch is directly affected by the accuracy with which a fishhook or the like is placed in a school of fish detected by a fish finder. To this end, there are several types of conventional fishing reels and water depth measuring device for measuring the wound or unwound length of a fishline. Each of the conventional water depth measuring device includes an electronic control section (main section) combined with a rotation transmitting section (mechanical section), and it is not easy to assemble and disassemble the water depth measuring device when repairing or replacing an element thereof. Also, it has been difficult to manufacture a water depth measuring device that is completely waterproof and not subject to water damage.

SUMMARY OF THE INVENTION

An object of the present invention is a water depth measuring device for a fishing reel in which and electronic control section and a rotation indication section are formed separately from each other.

Another object of the present invention is a water depth measuring device having and electronic control that is not subject to water damage.

Still another object of the present invention is a water depth measuring device that may be easily and unexpensively repaired.

These and other objects are accomplished by a water depth measuring device for a fishing reel comprising a reel body having a spool rotatably supported therein, reel rotation indicator means attached to the reel body and adapted to contact a fishline wound on the spool and to generate a line cast signal corresponding to the cast of fishline in response to the rotation of the spool, a watertight compartment mounted on the reel body, and a line cast indicator means in the watertight compartment and adapted to detect the line cast signal and to indicate the length of a fishline cast from the spool.

BRIEF DESCRIPTION OF THE DRAWINGS

The manner by which the above objects and other objects, features, and advantages of the present invention are attained will be fully apparent from the following detailed description when considered in view of the drawings wherein.

DETAILED DESCRIPTION

In the water depth measuring device of the present invention, a mounting seat is integrally provided on the upper portion of the body of a fishing reel. The main section of the water depth measuring device is preferably integrally formed and has a case in which electrical components such as a sensor, a controller, an indicator, a sound maker, and a power supply are enclosed in a watertight manner. The rotation transmitting section of the water depth measuring device is integrally formed and has a projecting case in which a roller and a magnet for detecting the rotation of the roller through the use of the sensor are supported and are movingly connected to each other through a rotation transmitting means. The projecting case is mounted on a support and urged by the force of a spring so that the roller can be brought into pressure contract with the surface of a fishline wound on a spool.

The main section and the rotation transmitting section are removably secured to the mounting seat in such a manner that both the sections are separated from each other. Since the main section and the rotation transmitting section for rotating the magnet by the rotation of the spool of the fishing reel through the roller are formed and provided separately from each other, the electrical components can be enclosed in a watertight manner in the case of the main section. For that reason, the main section can be formed as a single box so as to facilitate waterproofness. Since the main section and the rotation transmitting section are separately secured to the mounting seat of the body of the fishing reel, it is easier to assemble and the water depth measuring device during manufacture and to disassemble it to repair or replace a member thereof.

Figure 1:
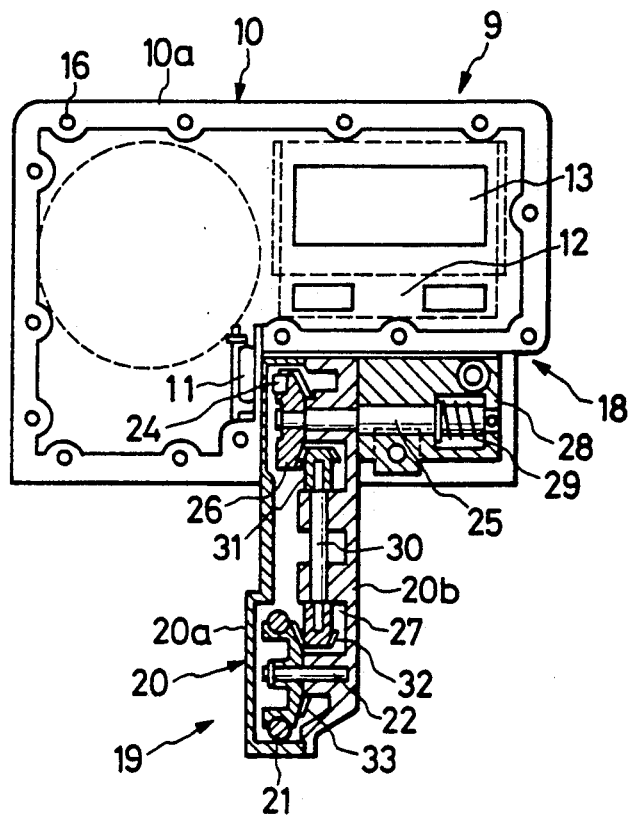
FIG. 1 shows a longitudinal sectional view of an embodiment of a water depth measuring device for a fishing reel according to the present invention.
Figure 2:
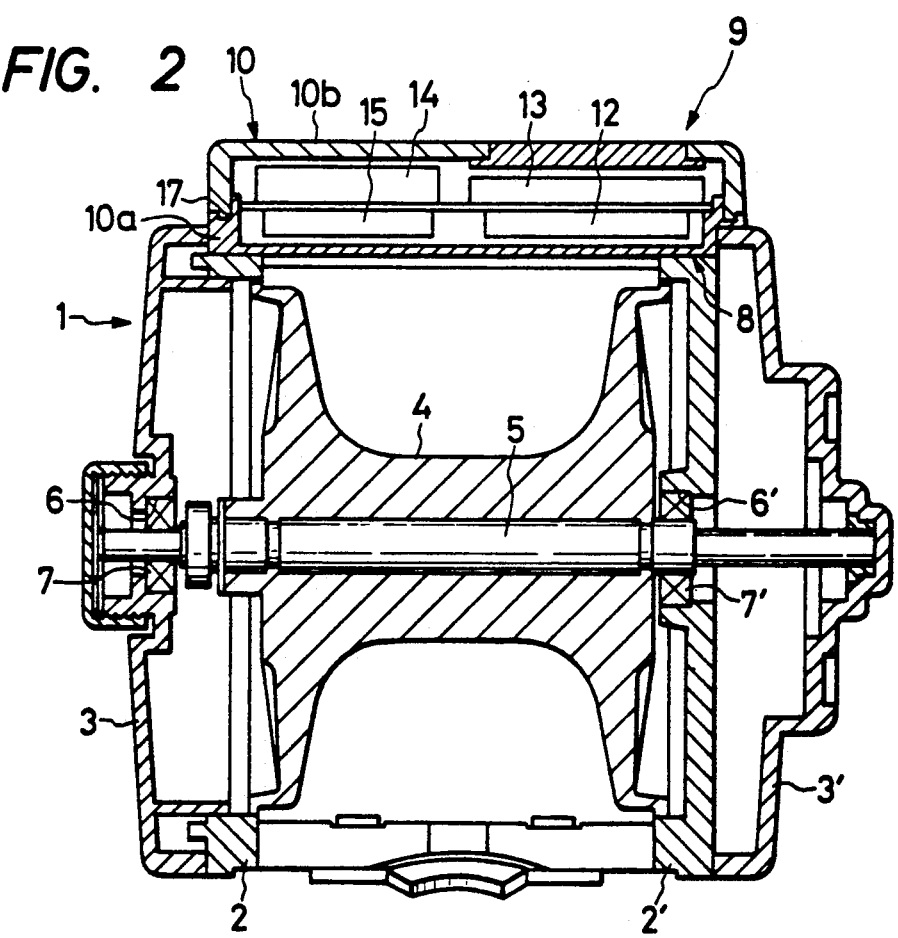
FIG. 2 is a longitudinal sectional view of a fishing reel fitted with the water depth measuring device of FIG. 1.
Figure 3:
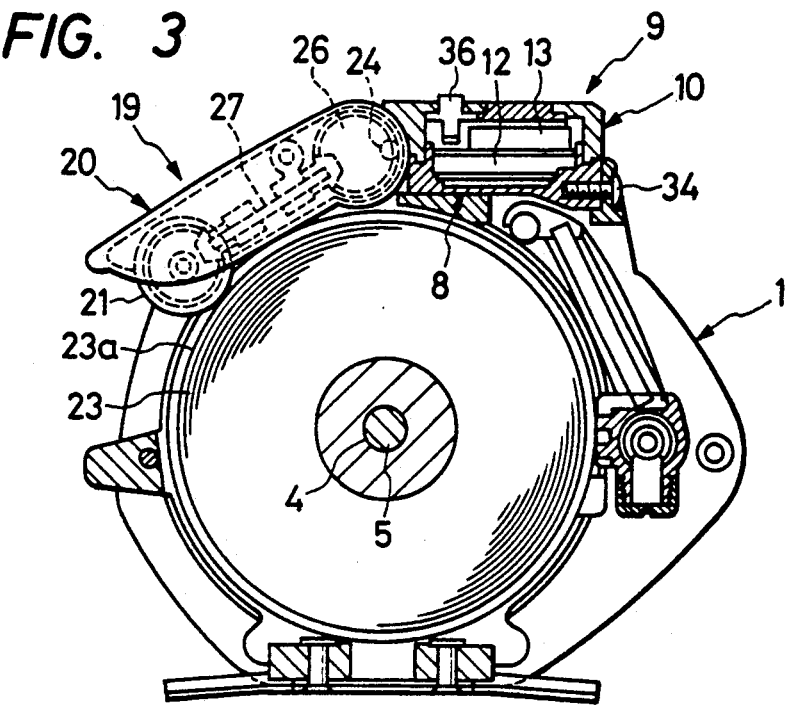
FIG. 3 is a cross-sectional view of a fishing reel fitted with the water depth measuring device of the present invention.
Figure 4:
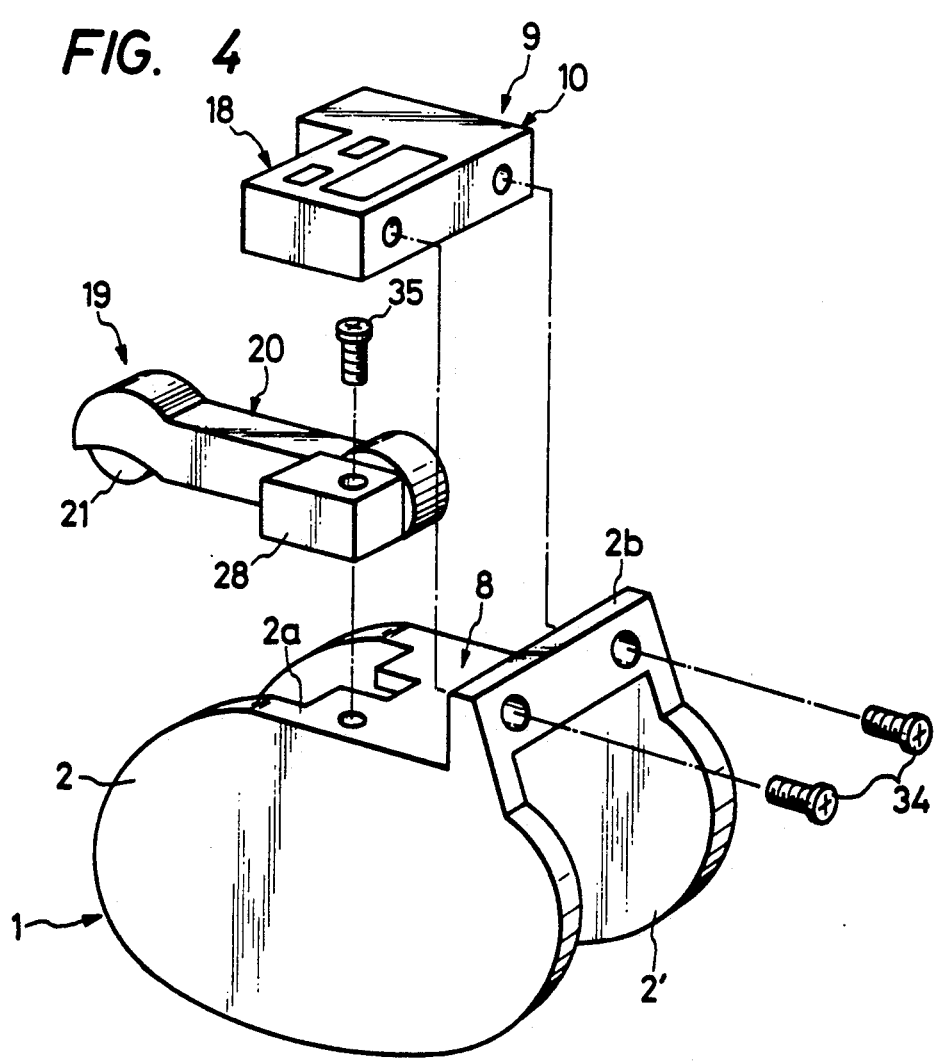
FIG. 4 shows a perspective, exploded view of the main section and rotation transmitting section of the water depth measuring device of the present invention and the body of the fishing reel.

As shown in FIGS. 2, 3 and 4, the body 1 of a fishing reel has cover plates 3 and 3' and secured by screws (not shown in the drawings) to the outsides of right and left side plates 2 and 2' so that the body is integrally formed. A spool shaft 5 is supported at both the ends thereof by bearings 7 and 7' in bearing holes 6 and 6' so that a spool 4 is supported between both the side plates 2 and 2' and can be rotated in conjunction with the rotation of a handle not shown in the drawings.

The side plates 2 and 2' are coupled to each other at the upper portions thereof by a coupling portion 2a which has a flat top. A projection 2b rises from the front part of the top of the coupling portion 2a and extends in parallel with the spool shaft 5 so that a seat 8 is provided on the top of the reel body 1 for mounting the main section and a rotation transmitting section of a water depth measuring device.

The main section 9 of the water depth measuring device has a flat case 10 made of a lower and upper members 10a and 10b having mutually symmetric forms and fitted on each other in a watertight manner. Electrical components such as a sensor 11 (e.g., a magnetic flux sensor), a controller 12, and indicator 13, a sound maker 14, a power supply 15, and a resetting button 36 are enclosed in a watertight manner in the case 10.

It is preferably that the fitted surfaces of the lower and upper members 10a and 10b of the case 10 are provided with a plurality of openings 16 and a plurality of projections 17, respectively. The projections 17 are fitted in the openings 16 after an adhesive is applied to the fitted surfaces to adhere the upper and the lower members to each other in a waterproof manner. Alternatively, a waterproof seal may be pinched between the fitted surfaces and the upper and lower members may be coupled to each other in a waterproof manner by a fastening means, such as screws. The plan view of the case 10 is shaped as an L or the like so that an open space 18 provided. The rotation transmitting section 19 is secured to the mounting seat 8 so that the rotation transmitting section is located in the open space 18.

The rotation transmitting section 19 is located in a projecting case 20, which is made of right and left members 20a and 20b coupled to each other. A roller 21 is rotatably supported by a shaft 22 under the tip of the projecting case 20 so that the roller can be brought into pressure contact with the surface 23a of a fishline 23 wound on the spool 4. A magnet 24 for sensing the rotation of the roller 21 through the use of a sensor 11 of the main section 9 of the water depth measuring device is provided at one end of the projecting case 20 and is secured to the side surface of a bevel gear 26 rotatably supported by a shaft 25. The roller 21 and the bevel gear 26 are movingly connected to each other by a rotation transmitting means 27, e.g., a link, to rotate the magnet 24 in conjunction with the rotation of the roller 21. The projecting case 20 is supported at the one end on one side of a support 28 by the shaft 25 so that the projecting case may be turned. The force of a torsion spring 29 is applied to the projecting case 30 in such a direction as to bring the roller 21 into pressure contact with the surface 23a of the fishline 23 wound on the spool 4.

The rotation transmitting means 27 is located in the projecting case 20 and comprises a rotary shaft 30 extending in the longitudinal direction of the case. Bevel gears 31 and 32 are secured to the ends of the rotary shaft and are engaged with bevel gears 26 and 33, respectively. The bevel gear 33 is supported at the tip of the projecting case 20 and fitted with an annular member made of rubber or the like. A rotation transmitting mechanism, e.g., a belt, may be provided instead of the rotation transmitting means 27. In the rotation transmitting mechanism, pulleys are supported instead of the bevel gears 26 and 33, and a belt is wound on the pulleys.

The shaft 25 is rotatably supported by the support 28 and urged n the circumferential direction thereof by the torsion spring 29. The projecting case 20 is secured to the shaft 25, while the bevel gear 26 is rotatably fitted on the shaft 25.

The main section 9 of the water depth measuring device is placed on the mounting seat 8 of the reel body 1 and secured to the projection 2b by screws 34. The rotation transmitting section 19 of the water depth measuring device is secured at the support 28 to the mounting seat 8 by a screw 35 so that the rotation of the magnet 24 being rotated in conjunction with the rotation of the roller 21 can be sensed by the sensor 11.

The water depth measuring device of the present invention performs the functions as follows:

1. Indication of approximate depth of water at which the end of the fishline is present;
2. Indication of length of unwound fishline; and
3. Preset depth warning buzzer.

An optional water depth can be set in a memory. An intermittent buzzer sound may be initiated when a fishhook or the like has reached a water depth that is about 5 m less than the set water depth. When the fishhook or the like has reached the set water depth, the buzzer is sounded continuously. The setting of the optional water depth is performed by using a set button. A new water depth is set every time the set button is pressed.

When a reset button is pressed, an indicated value becomes "000". When the indicated value has become 5 m, an intermittent buzzer sound is made through the action of the controller in order to prevent the tip of a fishing rod, the fishhook, the fishline, or the like from being damaged.

When the reset button is pressed, the indicated value is changed to "000" an the set water depth is cleared. This reset function can be used for zero adjustment and so forth.

What is claimed is:

1. A water depth measuring device for a fishing reel comprising:
    a reel body having a spool rotatably supported therein;
    reel rotation signal generating means connected to a supporting arm rotatably mounted on said reel body, said signal generating means for generating a magnetic flux line cast signal corresponding to a case length of fishline in response to the rotation of said spool, said signal generating means including a first roller for contacting a fishline wound on said spool, a second roller having a magnet attached thereto for generating said line cast signal, and means for linking said first roller to said second roller to rotate said second roller in response to the rotation of said first roller;
    a watertight compartment mounted on said reel body; and
    line cast sensor means disposed in said watertight compartment and adapted to detect said magnetic flux line cast signal through a wall of said watertight compartment,
    line cast indicator means connected to said sensor for indicating the length of a fishline cast from said spool.

2. A water depth measuring device according to claim 1, further including spring means adapted to bias said first roller into contact with a fishline wound on said spool.

3. A water depth measuring device according to claim 1, wherein said line cast indicator means includes a line cast indicator adapted to determine from said magnetic flux signal the length of fishline cast from said spool, and a display indicator for displaying said cast length.

4. A water depth measuring device according to claim 3, further comprising:
    a sound generating means for generating sound when a length of cast fishline is close to a first predetermined level and the length of cast fishline is not longer than a second predetermined level during takeup of the fishline;
    a control means engaged with said flux sensor for receiving said magnetic flux signal and transmitting a calculated signal to said sound generating means and said line cast indicator; and
    a reset button for resetting said first predetermined level and said second predetermined level.

5. A water depth measuring device according to claim 4, wherein said sound generating means is a buzzer.

6. A water depth measuring device according to claim 3, wherein said reel body includes a first mounting portion for supporting said watertight compartment and a second mounting portion, said water depth measuring device further including a support arm having an end mounted on said second mounting portion, said support arm rotatably supporting said first and second roller.

7. A water depth measuring device according to claim 1, wherein said compartment comprises a lower member and an upper member, each of said members including an engagement surface provided with a plurality of openings and a plurality of associated projections being fixed in said openings by an adhesive.

8. A water depth measuring device according to claim 1, wherein said sensor means is disposed adjacent to a wall of said water-tight compartment and said magnetic is disposed opposite said sensor exterior to said water-tight compartment such that said magnetic flux signal is generated exterior to said water-tight compartment and is detected by said sensor means within said water-tight compartment.

* * * * *

UNITED STATES PATENT AND TRADEMARK OFFICE
CERTIFICATE OF CORRECTION

PATENT NO. : 5,007,601
DATED : April 16, 1991
INVENTOR(S) : Masahura Emura et al.

It is certified that error appears in the above-identified patent and that said Letters Patent is hereby corrected as shown below:

Claim 1, Column 4, Line 29, change "case" to --cast--;

Claim 8, Column 6, Lines 7 & 8, change "magnetic" to --magnet--.

Signed and Sealed this

Fifteenth Day of December, 1992

Attest:

DOUGLAS B. COMER

*Attesting Officer*  *Acting Commissioner of Patents and Trademarks*